United States Patent [19]

Singleton

[11] 4,012,486

[45] Mar. 15, 1977

[54] PROCESS FOR REDUCING THE TOTAL SULFUR CONTENT OF CLAUS OFF-GASES

[75] Inventor: David M. Singleton, Seabrook, Tex.

[73] Assignee: Shell Development Company, Houston, Tex.

[22] Filed: July 2, 1975

[21] Appl. No.: 592,447

[52] U.S. Cl. .............................. 423/224; 423/230; 423/539; 423/564

[51] Int. Cl.² ........................................ B01D 53/34

[58] Field of Search .......... 423/224, 230, 244, 539, 423/542, 564

[56] References Cited

UNITED STATES PATENTS 1,900,751  3/1933  Baehr ........................... 423/539 X Primary Examiner—Earl C. Thomas

[57] ABSTRACT

The sulfur content of off-gases from processes such as the Claus process is treated by catalytically oxidizing the sulfur compounds to sulfur dioxide. By use of specific catalytic materials, low temperatures of reaction and minimal $SO_3$ formation are achieved.

11 Claims, No Drawings

PROCESS FOR REDUCING THE TOTAL SULFUR CONTENT OF CLAUS OFF-GASES

BACKGROUND OF THE INVENTION

Viewed in the light of increasingly stringent requirements with respect to air pollution abatement, incineration of $H_2S$-containing off-gases is no longer a satisfactory means of disposal. Various procedures have been developed to remove the $H_2S$ from the off-gases, and even recover, if possible, the $H_2S$ or reaction products of $H_2S$. For example, the well-known Claus process produces an effluent normally containing up to 2 percent or even 3 percent by weight sulfur compounds, a substantial proportion being $H_2S$.

To remove this concentration of sulfur compounds, selective absorption and desorption of the Claus off-gases, after reduction, has been practiced. In this procedure, the bulk of the desorbed $H_2S$ is returned to the Claus unit, and the final off-gas or tail gas, containing nitrogen, $CO_2$ and quite minor amounts of $H_2S$ is converted to $SO_2$, a material which generally has not been subjected to emission requirements as rigid as those applied to $H_2S$. However, incineration is costly because of the necessary heat input. Again, although some work has been done with regard to catalytic conversion of the $H_2S$ in the off-gas or tail gas to $SO_2$, concomitant formation of $SO_3$ has been a problem.

Andeeva, et al., Khim, Prom. (1946) No. 11, pp 17–18, also studied the oxidation of $H_2S$ to $SO_2$ in the presence and absence of catalysts. Among the catalysts studies were Ni, NiPb, NIBi, NiAg, NiMo, NiAl, NiPbAl, NiBiAl, and NiPbBi. According to the article, the most effective catalyst at 250° to 300° was NiAL, while the other catalysts required higher temperatures for equal results. The economic feasibility of this reported procedure is not known.

Accordingly, there has existed a need for an economical method for the removal of $H_2S$ from $H_2S$-containing streams, particularly off-gas streams of the type mentioned, which method would provide substantial recovery of the $H_2S$ values in the off-gas, and concomitantly provide low $SO_3$ emissions. The present invention satisfies that need.

SUMMARY OF THE INVENTION

The present invention comprises a process wherein a gaseous stream containing minor amounts of $H_2S$ and possibly other sulfur containing compounds is contacted with oxygen under reaction conditions in the presence of a catalyst containing bismuth as the catalytically active component. More particularly, the invention relates to a process for removing $H_2S$ from an off-gas, such as Claus plant effluent, wherein an off-gas containing minor amounts of $H_2S$ and other sulfur compounds is contacted with oxygen under reaction conditions in the presence of bismuth. In its preferred form, the invention relates to a process for removing $H_2S$ from an off-gas which has had the bulk of the $H_2S$ removed, such as by treatment with an absorbent, which comprises contacting the low concentration $H_2S$-containing off-gas with oxygen under reaction conditions in the presence of a catalyst containing bismuth. Surprisingly, any combustibles, e.g. $H_2$, CO, $CH_4$, present in the streams treated appear unaffected or substantially unaffected by the catalyst of the invention. The $SO_2$ formed may be vented or treated in a manner known to those skilled in the art.

Although the invention is apparently applicable to any $H_2S$-containing stream of low to moderate concentration, the invention is ideally suited to the treatment of $H_2S$-containing off-gases from various processes from which no further or little recovery of other materials is made. The invention is eminently suited, as indicated, to the treatment of off-gas from the "Claus" process. The "Claus" process is normally itself a "clean-up" process wherein elemental sulfur is prepared by partial oxidation of the $H_2S$, using oxygen-containing gas (including pure oxygen) to form $SO_2$, followed by the reaction of the sulfur dioxide product with the remaining part of the hydrogen sulfide, in the presence of a catalyst. The process, which is used frequently at refineries and also for the workup of hydrogen sulfide recovered from various gas streams, such as natural gas, is carried out by a plant which typically comprises a combustion chamber followed by one or more catalyst beds between which are arranged one or more condensers. The reaction products are cooled in these condensers and liquid elemental sulfur is recovered. Since the yield of elemental sulfur, relative to the hydrogen sulfide introduced, is not quantitative, a minor amount of unreacted hydrogen sulfide, COS, $CS_2$, and sulfur dioxide remains in the "Claus" off-gases. To some extent, the amount of elemental sulfur recovered depends on the number of catalyst beds employed in the Claus process. In principle, 98% of the total sulfur available can be recovered when three catalyst beds and three condensers are used. The invention is eminently suited to the removal of $H_2S$ from "Claus" plant effluents.

Additionally, as indicated, "Claus" plant effluents or off-gases have previously been processed by reducing the sulfur dioxide, COS, $CS_2$, and sulfur trioxide in the gas under suitable conditions to $H_2S$ in the presence of a catalyst, absorption of the $H_2S$, followed by desorption of the $H_2S$ and recycle of the $H_2S$ to the Claus plant. Such a procedure is described in commonly owned U.S. applications U.S. Ser. No. 162,814, pending filed July 15, 1971, U.S. Ser. No. 326,916, filed Jan. 1, 1973, pending and Belgian Pat. No. 770,058 issued Jan. 17, 1972, whose disclosures are incorporated herein by reference. Where this procedure is practiced, the invention provides for the removal of the quite minor or reduced amounts of $H_2S$, etc., remaining in the final off-gas or tail gas by contacting the tail gas with oxygen under the conditions indicated.

As indicated the catalyst employed in the process of the invention will be a material in which the catalytically active component consists or consists essentially of bismuth. In general, the bismuth will be present in the reaction zone as a compound or compounds, or as the element or compound combined in a carrier material. The particular form of the catalytic material, i.e., as a compound or the element or compound combined in a carrier material, does not appear to be critical. The inclusion in a carrier material may be as the element, a compound, or in some bound form. Where a carrier is employed, the only apparent requirement concerning the source of the bismuth is that the bismuth be in a form adapted to solution, either as an ordinary solution (both aqueous and organic solvents) or as a solution of a liquid or complex of bismuth. Compounds such as the salts, oxide, hydroxide, phosphate, carbonate, iodide, bromide, chloride, silicate, fluoride, tungstate, and mixtures thereof, may be used. The sulfate, nitrate, thiosulfate, nitrite, thiocyanate, sulfide, sulfite, oxychloride, citrate, acetate, etc., also may be used. Certain salts and the oxide and hydroxide of bismuth may change during the preparation of the catalyst, during heating in a reactor prior to use in the process of this invention, or may be converted to another form under the described reaction conditions, but such materials still function as effective catalysts, in the defined process. For example, bismuth nitrate, nitrite, carbonate, hydroxide, acetate, and the like, may be converted to the corresponding oxide and then sulfide under the reaction conditions defined herein. Such salts as the phosphate, sulfate, halides, and the like, of bismuth, which are stable or partially stable at the defined reaction temperatures, are similarly effective under the conditions of the described reaction, as well as such compounds which are converted to another form in the reactor. Bismuth oxide is a preferred material, since it is inexpensive and is readily formed into pellets or deposited on carriers, and may be readily formed in situ from various salts and hydroxides. The catalysts of this invention are solid at room temperature or are essentially solid under the conditions of reaction (although some volatilization may occur).

At any rate, the bismuth is present in a catalytic amount in contact with the reaction gases. Those skilled in the art can routinely determine the precise amount of catalytic material needed, given the general conditions described herein. Where a carrier is employed, for example, the bismuth will be present in an amount of from about 0.1 percent by weight to about 75.0 percent by weight, based on the total weight of the bismuth and the carrier material. Perferably, the range will be from about 1.0 percent by weight to about 30 percent by weight. If solid compounds of bismuth are employed, or if heavy concentrations of bismuth on a carrier are employed, the active materials will normally be diluted with inert materials so that activity may be regulated. Proper dilution is within the skill of the art and need not be detailed herein.

Excellent results have been obtained by packing the reactor with the defined catalyst particles as the method of introducing the catalytic surface. The size of the catalyst particles may vary widely but generally the maximum particle size will at least pass through a Tyler standard screen which has an opening of 2 inches, and generally the largest particles of catalyst will pass through a Tyler screen with one inch openings. Very small particle size carriers may be utilized with the only practical objection being that extremely small particles cause excessive pressure drops across the reactor. In order to avoid high pressure drops across the reactor, generally at least 50 percent by weight of the catalyst will be retained by a 4 to 5 mesh Tyler standard screen. However, if a fluid bed reactor is utilized, catalyst particles may be quite small, such as from about 10 to 300 microns. Those skilled in the art can readily determine appropriate particle size depending on reactor configuration and size, gas velocity, etc. If a carrier is used, the catalyst may be deposited on the carrier by methods known in the art, such as by preparing in aqueous solution or dispersion of the described catalyst, and mixing the carrier particles with the solution or dispersion until the active ingredients are deposited in or on the carrier. The coated particles may then be dried, for example, in an oven at about 110° C. Various other methods of catalyst preparation known to those skilled in the art may be used. When carriers are utilized, the carrier particles will be approximately of the same size as the final coated catalyst particles. Very useful carriers (and diluants) are Alundum, silica, silicon carbode, Carborundum, pumice, kieselguhr, asbestos, zeolites, and the like. The Alundums or other alumina carriers are particularly useful. The carriers may be of a variety of shapes, including irregular shapes, cylinders or spheres. Another method for introducing the reqired surface is to utilize as a reactor a small diameter tube wherein the tube wall is catalytic or is coated with catalytic material. If the tube wall is the only source of catalyst, the tube wall will generally be of an inernal diameter of no greater than 1 inch, such as less than ¾ inch in diameter, or preferably will be no greater than about ½ inch in diameter. Other methods may be utilized to introduce the catalytic surface. For example, the technique of a fluidized bed may be used.

The concentration of $H_2S$ in the streams treated may vary widely. Thus, the concentrations may range from trace quantities to quite significant amounts, and it will be recognized by those skilled in the art that $H_2S$ concentrations are not generally a limiting factor of the invention. For example, concentrations of $H_2S$ in the gases treated may range from 0.005 percent (molar basis) to 5.0 percent, or even 10.0 percent. Concentrations of COS and $CS_2$ present in Claus effluents are normally also minor, and will range for example, from about .01 percent (molar basis) to about 0.5 percent.

Reaction conditions employed may vary considerably. While the temperatures at which the reaction is carried out are not critical, it is an advantage of the invention that lower or more moderate temperatures may be employed. Temperatures of 150° C to 450° C are qite satisfactory, while temperatures of 250° C to 420° C are preferred.

Similarly, the pressures employed are not critical, and a wide range of pressures may be used. For example, the total pressure in the system of the invention normally will be at or in excess of atmospheric pressures, although in some embodiments, a partial vacuum may be used. Preferably, pressures will range from atmospheric to higher pressures, such as 5 or even 10 atmospheres. Steam may be present in the system, and in some instances, is preferred.

The flow rates of $H_2S$-containing gas and the oxygen are largely a matter of choice. Generally, gaseous flow rates of from about 1,000 GHSV to about 25,000 GHSV or even 50,000 GHSV may be used, with rates of from 2,000 GHSV to about 25,000 GHSV being preferred. Contact times, accordingly, are widely variable, and may range from 0.07 seconds to about 4.0 seconds, with contact times of from about 0.14 seconds to about 2.0 seconds being preferred.

The amount of oxygen supplied to the reaction zone is important, in that a stoichiometric excess, preferably a large excess, of oxygen is desired in order to react all the $H_2S$ and any COS and $CS_2$ present. In general, at least twice, and normally at least five times the stoichiometric amount of oxygen required for the reaction will be supplied. Preferably, from about 5 to 100, or even 200 times the stoichiometric amount of oxygen will be supplied. The oxygen may be supplied as relatively pure oxygen, air, mixtures of air and oxygen, as well as from other gaseous streams containing significant quantities of oxygen and other components which do not interfere significantly with the reaction contemplated.

DETAILED DESCRIPTION OF THE INVENTION

In order to demonstrate the invention more fully, the following experiments were conducted. A measured quantity of $H_2S$ is mixed with a controlled flow of nitrogen in a vessel containing glass beads. The diluted $H_2S$ then passes through a fritted vessel containing water before it enters a reactor. The temperature of the water is controlled so that there is a controlled quantity of water in the feed. Oxygen, as air, is introduced from a separate line, and prior to introduction into the reactor, is passed through a mixture of acidic and basic alumina to remove possible deleterious impurities.

A suitable catalyst, prepared by impregnation of an active substance into a support, is placed in the reactor and covered with a pre-heat bed of quartz chips. The reactor is made of vycor and contains a frit which supports the catalyst. The feed mixture and the air enter at the top of the reactor and are mixed and heated in the pre-heat section. The temperature is measured by a thermocouple which is situated in an axial thermowell at about the middle of the catalyst bed. Product sampling is carried out by passing the effluent stream from the reactor through a scrubber train. The first scrubber contains 90% isopropanol at 0° C and this removes $SO_3$ as sulfuric acid, formed by reaction of the $SO_3$ with the 10% of water present. The function of the isopropanol is to inhibit the oxidation of $SO_2$ to $SO_3$. The $SO_2$ is trapped in a second scrubber, which contains 3% hydrogen peroxide solution. The peroxide solution oxidizes the $SO_2$ to $SO_3$, which forms sulfuric acid in the solution. The $H_2S$ then passes into a third scubber which contains excess sodium hydroxide. The $H_2S$ reacts to form $Na_2S$, which is trapped. The remaining gas, which is a mixture of nitrogen and air, is passed to a wet-test meter and is measured. The isopropanol solution is treated with a pyridine/acetic acid buffer and is titrated with lead perchlorate solution using a lead sensitive electrode to determine the end-point. The hydrogen peroxide solution is titrated with standard sodium carbonate, using an indicator. The sodium sulfide is titrated with silver nitrate in the presence of ammonia. The reactor is heated externally using an electric furnace controlled by thermelectric proportional controllers. The temperature is sensed by three thermocouples which are situated, one to each section of the reactor, in a tube at the skin of the reactor. That the reaction is exothermic is shown by the fact that the temperature of the catalyst rises upon introduction of the feed and is maintained above the set temperature of the furnace as long as the feed is being passed. Results of the experiments, using different active materials, are shown, as follows:

EXAMPLE I

Employing the general procedure set forth, four samplings were taken employing a catalyst of Bi deposited on an alumina having an average surface area of 386 square meters per gram and a porosity of 0.46 cc/gram. The Bi was deposited as an acidic solution of the chloride, and the chloride ion was removed by treatment with $NH_4OH$, followed by a water wash. The catalyst was then calcined at 500° C before use. The Bi constituted approximately 10 percent by weight of the composite, calculated as Bi metal. Ratios of $H_2S$ to $N_2$ are those recorded at the end of each sampling. The results are set forth in Table 1.

TABLE I

| | $H_2S/N_2$ (cc/min) | AIR (cc/min) | GHSV RT | ° C | $H_2S$ IN FEED (PPM) |
|---|---|---|---|---|---|
| 1 | 1043 | 938 | 5943 | 262 | 393 |
| 2 | 1754 | 271 | 6075 | 263 | 381 |
| 3 | 1807 | 122 | 5787 | 283 | 422 |
| 4 | 3000 | 277 | 9831 | 278 | 589 |
| 5 | 2353 | 1101 | 10362 | 290 | 555 |

| | REACTOR TEMP GHSV | $H_2S$ IN PRODUCT (PPM) | $SO_2$ IN PRODUCT (PPM) | $SO_3$ IN PRODUCT (PPM) | CATALYST AGE |
|---|---|---|---|---|---|
| 1 | 10,709 | <0.01 | 359 | 1.4±0.1 | 21 Hours |
| 2 | 10,959 | 0.59 | 408 | 0.10 | 186 Hours |
| 3 | 10,829 | <0.01 | 455 | 0.60 | 234 Hours |
| 4 | 18,231 | 33.4 | 551 | <0.025 | 257 Hours |
| 5 | 19,642 | 0.16 | 582 | ≤0.60 | 353 Hours |

EXAMPLE II

Employing the general procedure set forth, five samplings were taken employing a catalyst of Bi deposited on an alumina having an average surface area of 386 square meters per gram and a porosity of 0.46 cc/gram. The Bi was deposited as a solution of the tungstate, and the catalyst was calcined at 500° C before use. The Bi constituted approximately 4 percent by weight of the composite calculated as Bi metal. Ratios of $H_2S$ to $N_2$ are those recorded at the end of each sampling. The results are set forth in Table II.

TABLE II

| RUN | $H_2S/N$ (cc/min) | AIR (cc/min) | GHSV RT | ° C | $H_2S$ IN FEED (PPM) |
|---|---|---|---|---|---|
| 1 | 1075 | 968 | 6129 | 298 | 1149 |
| 2 | 930 | 968 | 5694 | 263 | 1041 |
| 3 | 1734 | 221 | 5864 | 299 | 104 |
| 4 | 1818 | 240 | 6174 | 300 | 327.5 |
| 5 | 3297 | 500 | 11,391 | 312 | 293 |

| RUN | REACTOR TEMP. GHSV | $H_2S$ IN PRODUCT (PPM) | $SO_2$ IN PRODUCT (PPM) | $SO_3$ IN PRODUCT (PPM) | CATALYST AGE |
|---|---|---|---|---|---|
| 1 | 11,779 | <0.01 | 923.0 | <0.1 | 25 Hours |
| 2 | 10,272 | <0.01 | 936.0 | <0.1 | 120 Hours |
| 3 | 11,291 | <0.01 | 59.2 | <0.1 | 192 Hours |
| 4 | 11,911 | <0.01 | 236.0 | <0.1 | 288 Hours |
| 5 | 22,445 | <0.01 | 232.0 | 0.95 | 367 Hours |

EXAMPLE III

Employing the general procedure set forth, five samplings were taken employin a catalyst of Bi deposited on 3/16 inch alumina extrudate. The Bi was deposited as a solution of the thiosulfate, and the catalyst was dried at 120° C before use. The Bi constituted approximately 10 percent by weight of the composite calculated as Bi metal. Ratios of $H_2S$ to $N_2$ are those recorded at the end of each sampling. The results are set forth in Table III.

TABLE III

| RUN | $H_2S/N$ (cc/min) | AIR (cc/min) | GHSV RT | °C | $H_2S$ IN FEED (PPM) |
|---|---|---|---|---|---|
| 1 | 1786 | 192 | 5934 | 262 | 355 |
| 2 | 1796 | 231 | 6081 | 263 | 348 |
| 3 | 1754 | 165 | 5759 | 262 | 387 |

| RUN | REACTOR TEMP. GHSV | $H_2S$ IN PRODUCT (PPM) | $SO_2$ IN PRODUCT (PPM) | $SO_3$ IN PRODUCT (PPM) | CATALYST AGE |
|---|---|---|---|---|---|
| 1 | 10,693 | 0.10 | 359 | 14.6 | 20 Hours |
| 2 | 10,970 | 0.33 | 351 | 2.1 | 41 Hours |
| 3 | 10,377 | 1.2 | 377 | 1.0 | 64 Hours |

EXAMPLE IV

The general procedure is followed, utilizing a catalyst containing 2 percent by weight Bi deposited on α-alumina. The Bi is deposited as the citrate in the presence of aqueous ammonia which has been found to promote the impregnation of the active material. Excellent results are obtained.

I claim:

1. In a process for the oxidation of $H_2S$ to $SO_2$ in a gaseous stream containing $H_2S$ wherein the gaseous stream is contacted with a stoichiometric excess of oxygen with respect to the $H_2S$ at a temperature of from 150° to 450° C in the presence of a catalyst, the improvement wherein the catalytically active component of the catalyst consists of Bi.

2. The method of claim 1 wherein the oxygen is supplied as air.

3. The method of claim 2 wherein the gaseous stream is an off-gas from a Claus plant.

4. A process for the removal of minor amounts of $H_2S$ from a gaseous effluent comprising, contacting the gaseous effluent with a stoichiometric excess of oxygen with respect to the $H_2S$ at a temperature of from 150° to 450° C in the presence of a catalyst, the catalytically active component of which is Bi.

5. The method of claim 4 wherein the oxygen is supplied as air.

6. In a method wherein a gaseous effluent containing minor amounts of $H_2S$, $SO_2$, $SO_3$, COS and $CS_2$ is contacted with a reducing gas in the presence of a catalyst under reaction conditions to convert the bulk of the $SO_2$, $SO_3$, COS, and $CS_2$ to $H_2S$ in the effluent is absorbed and recovered, to produce an off-gas containing a reduced concentration of $H_2S$, the improvement comprising contacting the off-gas with a stoichiometric excess of oxygen with respect to the $H_2S$ remaining in the off-gas at a temperature of 150° C to 450° C in the presence of a catalyst, the catalytically active component of which is Bi.

7. The method of claim 6 wherein the oxygen is supplied as air.

8. The method of claim 1 wherein the Bi is present as bismuth oxide.

9. The method of claim 1 wherein the Bi is present as bismuth sulfide.

10. The method of claim 6 wherein the Bi is present as bismuth oxide.

11. The method of claim 6 wherein the Bi is present as bismuth sulfide.

* * * * *